United States Patent [19]
Ziegler et al.

[11] Patent Number: 4,967,544
[45] Date of Patent: Nov. 6, 1990

[54] AUTOMATIC SPEED CONTROL SYSTEM FOR A HARVESTING ASSEMBLY

[75] Inventors: Duane H. Ziegler, Colona; Charles P. Barbaro, Rock Island, both of Ill.; D. Keith Dewey, Waterloo; Steven L. Wildemuth, Bettendorf, both of Iowa; Frederick W. Nelson, Moline, Ill.; Kenneth D. Friend, Cedar Falls; Terence D. Pickett, Waterloo, both of Iowa

[73] Assignee: Deere & Company, Moline, Ill.

[21] Appl. No.: 455,486

[22] Filed: Dec. 22, 1989

Related U.S. Application Data

[63] Continuation of Ser. No. 294,533, Jan. 5, 1989, abandoned.

[51] Int. Cl.$^5$ ...................... A01D 41/02; A01D 69/00
[52] U.S. Cl. .................................. 56/10.200; 56/11.1; 460/1
[58] Field of Search ...................... 56/10.2, 10.9, 10.8, 56/11.1, DIG. 15; 460/1, 2, 3, 4, 5, 6, 7

[56] References Cited

U.S. PATENT DOCUMENTS

| | | | |
|---|---|---|---|
| 3,589,110 | 6/1971 | Schreiner et al. | |
| 3,609,947 | 10/1971 | Herbsthofer | |
| 3,759,021 | 9/1973 | Schreiner et al. | |
| 3,982,384 | 9/1976 | Rohweder et al. | |
| 4,008,558 | 2/1977 | Mott | |
| 4,142,348 | 3/1979 | Jordan et al. | 56/10.2 |
| 4,188,772 | 2/1980 | Jordan et al. | 56/10.2 |
| 4,205,508 | 6/1980 | Long | 56/10.2 |
| 4,332,127 | 6/1982 | Staiert et al. | 56/10.2 |
| 4,337,611 | 7/1982 | Mailander et al. | 56/DIG. 15 |
| 4,376,298 | 3/1983 | Sokol et al. | 460/1 |
| 4,430,846 | 2/1984 | Presley et al. | 56/DIG. 15 |
| 4,458,471 | 7/1984 | Herwig | 56/10.2 |
| 4,487,002 | 12/1984 | Kruse et al. | 56/DIG. 15 |
| 4,513,562 | 4/1985 | Strubbe | 56/10.2 |
| 4,527,241 | 7/1985 | Sheehan et al. | 56/10.2 |
| 4,567,719 | 2/1986 | Soots et al. | |

FOREIGN PATENT DOCUMENTS

| | | |
|---|---|---|
| 0122343 | 4/1983 | European Pat. Off. |
| 2560404 | 2/1985 | France |
| 1375827 | 11/1974 | United Kingdom |
| 2205179 | 5/1987 | United Kingdom |

OTHER PUBLICATIONS

"Adaptive Feed Rate Control of Small Combine Harvester-Digital Sampled-Data Adaptive Control System", Japanese publication.
"Automatic Feed Rate Control of a Combined Harvester In Wheat", W. Huisman, J. J. Heijning, J. van Loo and O. C. Bergman, Department of Agricultural Engineering, Agricultural University Wageningen, Mansholtlaan 12 Wageningen, the Netherlands, dated Jun. 1-20, 1974.
"Automatic Reed Control 'Saves Up to 2 Bu./Acre'", Farm Show, vol. 6, Eagle Engineering and Manufacturing Inc.
Combine Harvesting-FMO 151B, pp. 136 and 137.
Principles of Farm Machinery, Kepnen et al., AVI Publ., 1978.
"Automation on Combines" from Grundl. Lantechnik, vol. 35 (1985) #4.

Primary Examiner—Ramon S. Britts
Assistant Examiner—Terry Lee Melius

[57] ABSTRACT

The present invention is directed to a speed controller system for the gathering unit of a harvesting assembly wherein the speed is controlled as a ratio of the ground speed of the harvesting machine. The system is provided with an electronic controller having a ground speed sensor and a speed sensor for the gathering units. The operator through a ratio selector selects the desired speed ratio and the controller controls the speed of the gathering unit accordingly. The controller can be ised with different harvesting assemblies such as a platform having a reel or belt pickup gathering unit; or a row crop header having a conventional row crop gathering unit or a corn picker row unit. The controller is also provided with a diagnostic routine for flagging problem areas with the system. The flagged problem areas are assigned a diagnostic code which is displayed in a defined order.

13 Claims, 12 Drawing Sheets

AUTOMATIC SPEED CONTROL SYSTEM FOR A HARVESTING ASSEMBLY

This application is a Continuation of application Ser. No. 07/294,533 filed 1-5-89 now abandoned.

BACKGROUND OF THE INVENTION

1. Field of the Invention

The invention is directed to an automatic control system for controlling the speed of a harvesting assembly. More specifically, the present invention comprises an electronic controller for controlling the speed of a harvesting reel, pickup belt, row crop head gathering belts and/or corn head gathering chains and snapper rolls.

2. Description of the Prior Art

Harvesting machines, such as combines, may be provided with different harvesting assemblies. More specifically, the farmer may use a harvesting platform for small grain and a row crop header for soybeans. Each harvesting assembly is provided with a gathering unit. The harvesting platform may be provided with a reel or belt pick-up. The typical row crop header is provided with rubber gathering belts. A corn head type of row crop header is provided with snapping rolls and gathering chains for gathering the corn stalks to the combine. It is important that these gathering units be driven at a specified ratio of the ground speed of the combine to minimize harvesting losses.

The reel of the harvesting platform is used to draw a section of the crop against the cutter bar of the harvesting platform. After cutting, the reel pushes or lifts the crop into the path of a collecting auger assembly. Reels may either comprise a bat or slat type reel, or a pickup reel having fingers for picking up downed crops. The speed of the reel is a critical variable in controlling harvesting losses. If the reel is rotating too slow, the crop is not pushed against the cutter bar, and the cut crop will fall on the ground as the reel does not push it onto the platform. Alternatively, if the reel is rotating too fast, the crop may be shattered by the impact of the reel or maybe pushed down before it can be cut leaving the uncut grain on the field. Therefore, it is desirable to drive the reel at a speed that is some ratio of the ground speed. Under most conditions, in upright crops, it is desirable to run the reel at 1.25–1.5 of the ground speed of the combine. However, in other crop conditions, different reel speeds may be desirable.

With conventional or modern harvesting platforms, the reel is driven by a hydraulic motor. The operator by controlling the flow of hydraulic fluid to the motor controls the speed of the reel. As this is a manual procedure, the operator must constantly monitor the reel and its impact on the standing grain to insure the reel is being driven correctly. This becomes difficult when the operator must speed up or slow down for varying field conditions because it necessitates continual adjustment of the reel speed. Electronic control system for controlling the various combine operations are illustrated in U.S. Pat. Nos. 4,332,127, 4,337,611, 4,513,562 and 4,527,241. An automatic electronic control system for controlling the reel speed of a harvesting platform is proposed in U.S. Pat. No. 4,430,846. In this patent, an electronic ground speed sensor provides a ground speed signal to electronic circuitry which adjusts an electrohydraulic valve controlling the speed of the reel. Other reel speed control systems for harvesting platforms are disclosed in U.S. Pat. Nos. 4,142,348, 4,188,772, and 4,205,508.

A pickup platform is provided with a pickup belt for gathering in a windrowed crop. The belt is provided with steel or plastic fingers that engage the windrow and gather it into the platform. As with the reel, the pickup belt is driven by a hydraulic motor. It is important that the pickup belt be driven at a correct speed relative to the ground speed of the combine. For example, excessive speeds will result in shattering losses by the fingers contacting the grain. Fast speeds also tend to tear apart the windrow causing uneven feeding of the threshing cylinder. A slow pickup speed, relative to the ground speed of the combine, may result in bunching, increase shatter losses, and uneven feeding. It is desirable that the speed of the pickup belt be adjusted to operate at a speed that makes it appear that the windrow is simply being lifted up as the pickup goes underneath.

On the corn head, the snapping rolls grab the corn stalks and pull them rapidly down between the rolls. As the ear of corn reaches a snapping bar the ear is snapped free from the stalk. The gathering chains guide the corn stalks into the snapping rolls, catch the snapped ears and direct them to the combine. It is important that the snapping rolls and gathering chains be operated at a correct speed relative to the ground speed of the combine. The relative speed of the gathering chains to the snapping rolls is fixed by the head. The snapping rolls must operate to pull the stalks through the rolls before the combine rolls over them. Excessive speed may cause the ears to bounce off the corn head.

The rubber gathering belts on the typical row crop header hold the crop while it is being cut by a knife. Then, after the crop is cut, the gather belts transport the crop to the combine. It is desirable that they be driven at approximately the same speed as the combine to minimize harvesting losses.

Typically, the row crop header and the corn head are driven by a belt coupled to the driven sheave on the feederhouse. The speed of the feederhouse is regulated by a variable sheave assembly. The variable sheaves are provided with hydraulic actuators for controlling the diameter of the variable sheave and thereby the speed of the feederhouse. As such, the speed of the feederhouse relative to the headers is constant, and only by changing the speed of the feederhouse does the speed of the header change.

SUMMARY OF THE INVENTION

The present invention comprises a microcomputer that is programmed to control the flow of hydraulic fluid to either the hydraulic motors which drive the gathering units, or the valves which control the positioning of variable sheaves. With a harvesting platform, a permanent magnet D.C. gear motor controls a hydraulic flow control valve. The microcomputer is supplied input signals from three main input assemblies. The first input assembly is an operator setable ratio switch which sets the desired speed ratio of the gathering units. The second input assembly comprises speed sensors that sense the ground speed of the combine and the speed of the gathering unit. Two of the sensors form feedback units for a microcomputer so that the speed of the harvesting assembly can be precisely controlled. The third input assembly comprises a series of switches that are tailored to each combine propulsion assembly so that ground speed can be accurately calculated. The third input sensor assembly is also provided with a diagnostic switch for triggering the diagnostic routine in the software program stored in the microcomputer.

With a row crop header, hydraulically positioned variable sheaves for driving the feederhouse are used to control the speed of the gathering units. The flow of hydraulic fluid to the variable sheaves is controlled by solenoid valves that are electrically coupled to the microcomputer. As with the harvesting platform, the microcomputer is supplied inputs from three main input assemblies. The first is the setable ratio selector. The second is the ground speed sensor and gathering unit speed sensors. The third are the combine propulsion system switches. The microcomputer positions the variable sheaves through manipulation of the solenoid valves thereby controlling the speed of the row crop gathering units.

It is an object of the present invention to provide an automatic speed control system for a harvesting assembly having a feed back loop which senses the speed of the harvesting assembly gathering unit to better minimize harvesting losses.

It is another object of the present invention to provide an automatic control system that can be used with a plurality of harvesting assemblies such as a harvesting platform having either a reel or pickup belt, or a row crop header having either corn snapper rolls and gathering chains, or rubber gathering belts.

Three basic software routines are stored in the microcomputer. The first named REEL controls the speed of gathering units on a harvesting platform. The second named PICKER controls the speed of gathering units on a row crop header. The third is a diagnostic routine comprising two sub-routines named DGNSET and DIADSP. DGNSET performs the diagnostic functions, whereas DIADSP controls the prioritization and display of the results.

A switch tells the microcomputer what type of harvesting assembly is mounted to the combine. This switch merely couples a port of the microcomputer to ground when a row crop header is mounted to the combine. This switch dictates if the REEL or PICKER routine is used.

The DGNSET sub-routine of the software stored in the microcomputer is triggered by a technician actuating a switch and starting the machine. As the machine is running at the correct ground speed, the gathering units are exercised through a predetermined routine by the software so that the various elements can be evaluated in an operational situation. DGNSET sets various diagnostic flags to identify problem areas. The DIADSP sub-routine is provided with a priority sorting mechanism by which various diagnostic flags that have been set during the DGNSET sub-routine are prioritized to more correctly indicate a problem area. The DIADSP sub-routine then provides an output to a diagnostic display comprising four LED's which the technician checks against a table in a maintenance manual.

The software for driving the gathering units of the harvesting platform is provided with a non-linear routine for driving the gathering unit to a zero error condition. More specifically, the larger the error, the larger the signal used to drive a gear motor which controls the positioning of a valve for supplying hydraulic fluid to the hydraulic motor of the gathering unit.

DETAILED DESCRIPTION

Operation of the Combine

Figure 1:
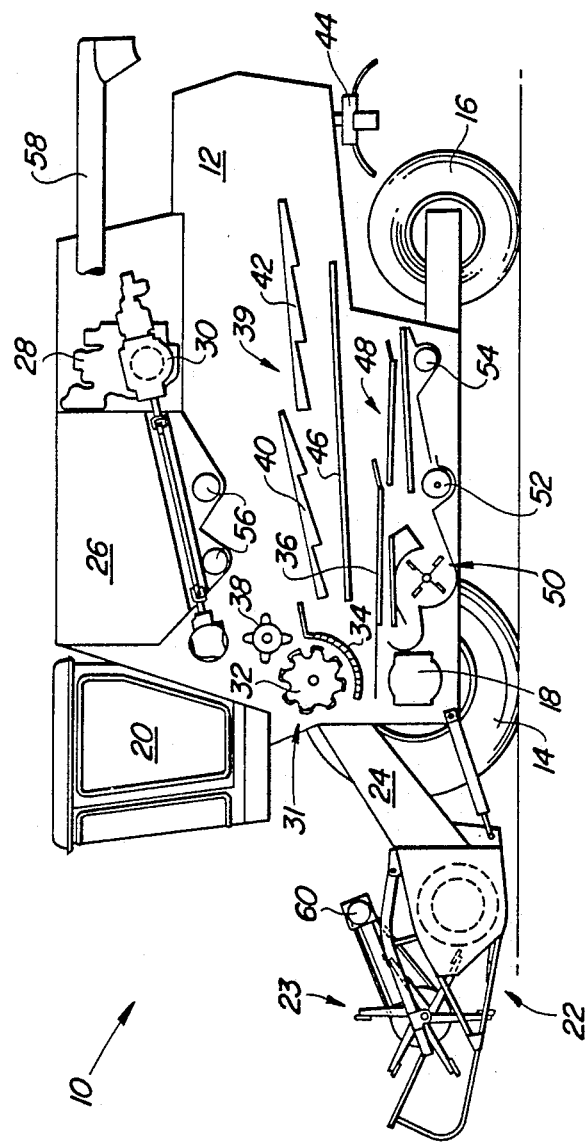
FIG. 1 is a side view of a combine schematically illustrating the various operating assemblies.

FIG. 1 illustrates an agricultural combine harvesting machine. Agricultural combine 10 has a chassis 12 and ground engaging wheels 14 and 16. Forward ground engaging wheels 14 are driven by hydraulic motor 18 which is located between the wheels and which is provided with a suitable transmission 19. An operator seated in operator control cab 20 controls the operation of the combine. Harvesting platform 22 having reel 23 extends forwardly from the chassis of the combine and is used for harvesting a crop in the field.

The harvesting platform and reel are similar to the platform and reel disclosed in U.S. Pat. No. 4,008,558, assigned to the assignee of the present application, and incorporated herein by reference.

After harvesting, the crop is then directed through feederhouse 24 into the combine. Clean grain compartment 26 is located behind the operator's cab at the top of the combine. Behind compartment 26 is transverse internal combustion engine 28 which is the prime mover of the combine, powering the propulsion means, the harvesting means, and the threshing and separating means. The internal combustion engine 28 is provided with driving means 30 for powering the various usage assemblies.

Between the side sheets of the combine, which form the chassis of the combine, is located the threshing and separating means. The threshing and separating means separates the grain from the straw and chaff of the harvested crop. The feederhouse directs the harvested grain to the threshing means 31 which comprises rotating transverse threshing cylinder 32, transverse concave 34, and rotating beater 38. As the crop passes between the cylinder 32 and the concave 34, grain and chaff fall through the concave to pan 36 and the remaining straw and unseparated grain is advanced to beater 38.

After threshing, the straw and the remaining crop is advanced to separating means 39. The main elements of the separating means are straw walkers 40 and 42, and cleaning shoe assembly 48. From beater 38, the crop is directed to the oscillating straw walkers 40 and 42 which move the straw to the rear of the combine where it is returned to the field by straw spreader 44. Grain and chaff falling through the straw walkers falls onto oscillating slanted pan 46 which directs the grain and chaff to pan 36. The grain and chaff are directed from pan 36 by overhead auger assemblies to cleaning shoe assembly 48 which is used to separate the chaff from the grain. The grain and chaff falling into the chaffer and sieve of the cleaning shoe assembly encounters an air stream from fan 50 which blows the lighter chaff out the rear of the combine while the heavier grain falls through the cleaning shoe assembly and into clean grain receiving auger 52.

Auger 52 directs the clean grain to a clean grain elevator (not shown) which in turn directs the grain to clean grain compartment 26. Tailings, that is unthreshed heads of grain, fall into tailings auger 54 which directs the unthreshed heads back to the threshing cylinder and concave. When the clean grain compartment is to be unloaded, transverse unloading augers 56 direct the grain to the side of the compartment from where it comes into contact with the vertical unloading auger (not shown) which directs the clean grain through unloading tube 58.

The drive system for driving all of these operating assemblies is disclosed in U.S. patent application, Ser. No. 193,434, filed 12 May 1988, and assigned to the present assignee, and is incorporated herein by reference.

It should also be noted, that the combine maybe provided with other harvesting assemblies such as a pickup belt platform similar to the one disclosed in U.S. Pat. No. 4,567,719, assigned to the assignee of the present patent application, and incorporated herein by reference; or a row crop or corn head similar to the ones disclosed in U.S. Pat. Nos. 3,982,384 and 3,759,021, respectively, both assigned to the assignee of the present application and incorporated herein by reference.

Drive System For Harvesting Assemblies

The present invention will be described as controlling the speed of a reel on a harvesting platform or the picker units of a corn head. However, the present invention may be used to a drive a pickup belt or the gathering belts of a row crop head. In addition, the term reel as used in this application includes bat or slat-type reels, or pickup reels.

Reel 23 is driven by hydraulic motor 60 which is fluidically coupled to hydraulic pump 61. As seen in the flow chart illustrated in FIG. 2, internal combustion engine 28 drives main hydraulic pump 62 which is fluidically coupled to and drives hydraulic motor 18 which is operatively coupled to transmission 19. The transmission in turn is operatively coupled to final drive assembly 64 which is used to drive wheels 14.

Pump 61 is driven by the header drive assembly, so that the pump is driven only when the header is being operated. Fluid from pump 61 is directed to flow control valve 70 before being directed to motor 60. Flow control valve 70 is a metering valve whose metering is controlled by a permanent magnet D.C. gear motor 72. The gear motor can be driven in both the forward and reverse directions by reversing the polarity of the electric energy directed to the motor.

The operator is provided with a manual control switch 73 for electrically controlling the gear motor and in turn the position of the flow control valve. Switch 73 is a neutral return switch so that when it is released by the operator, it returns to neutral position electrically decoupling motor 72 from a source of electrical energy. The speed of the hydraulic motor is governed by the amount of hydraulic fluid being directed to motor 60 by valve 70. The operator through control switch 73 selectively positions the flow control valve to control the speed of the pickup reel.

Figure 2:
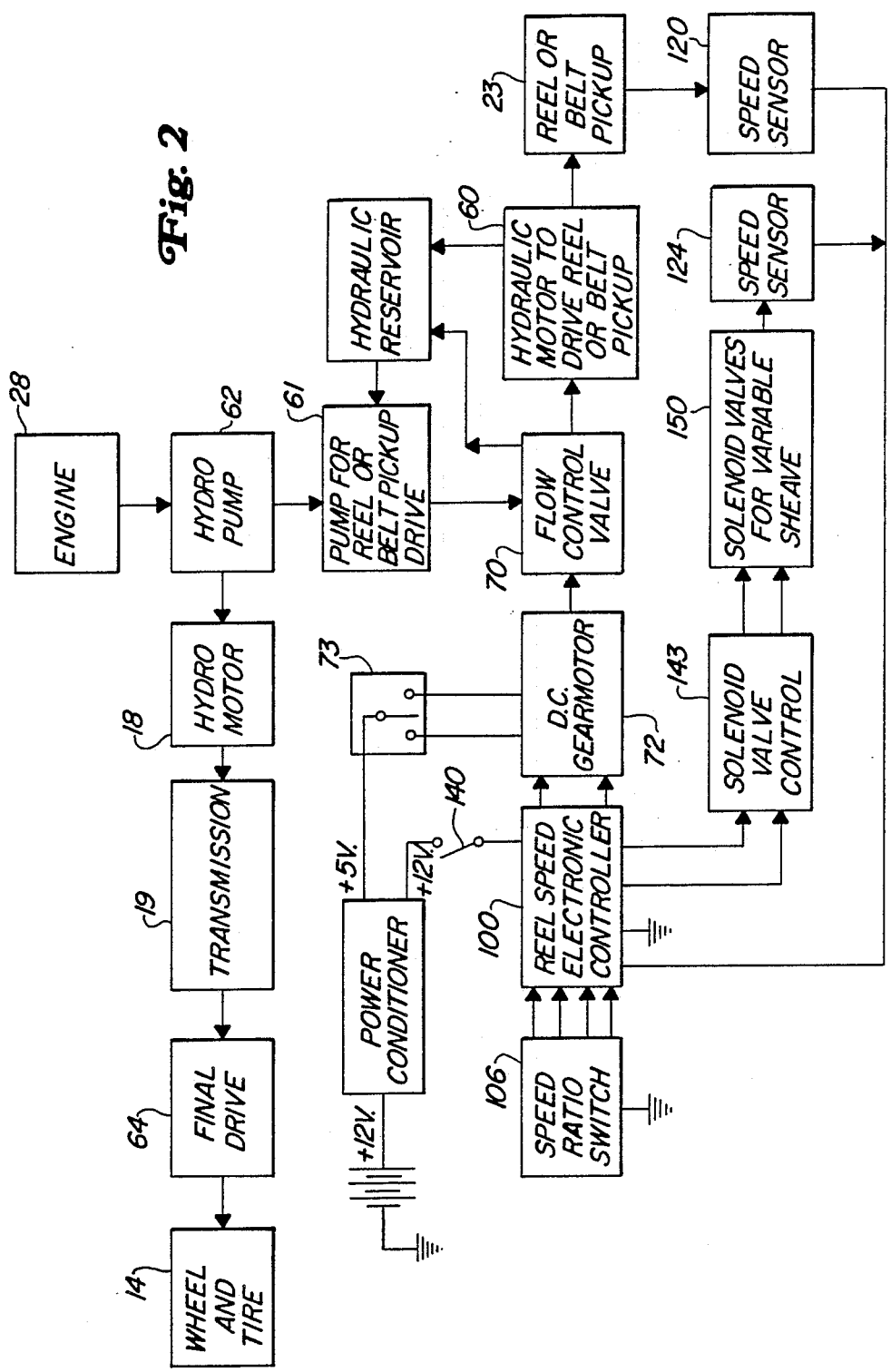
FIG. 2 is a schematic flow chart of the automatic controller for controlling the speed of the gathering units of the harvesting assembly.
Figure 3:
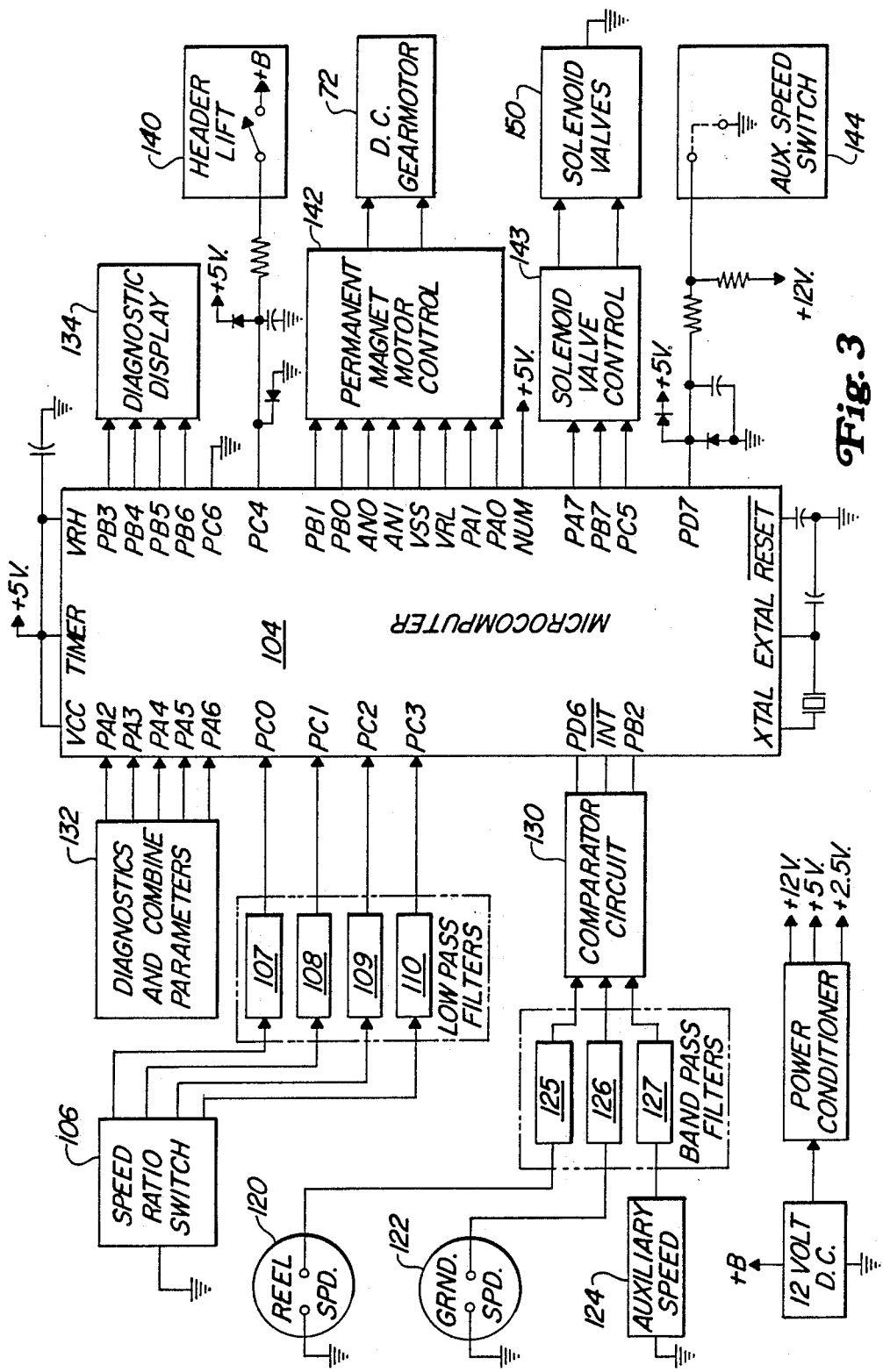
FIG. 3 is an electrical flow chart of the automatic controller.

Also illustrated in FIG. 2 is solenoid valve control 143 and solenoid valves 150 which are used to control the positioning of variable sheaves for controlling the speed of the feederhouse. The driven sheave on the feederhouse drives the picker units thereby controlling the speed of the corn head gathering units. The diameter of the variable sheaves is adjusted by hydraulic actuators that are hydraulically coupled to a source of pressurized hydraulic fluid. Solenoid control valves 150 regulate the flow of hydraulic fluid to the actuators and thereby the diameter of the variable sheaves.

Automatic Control System

Figure 4:
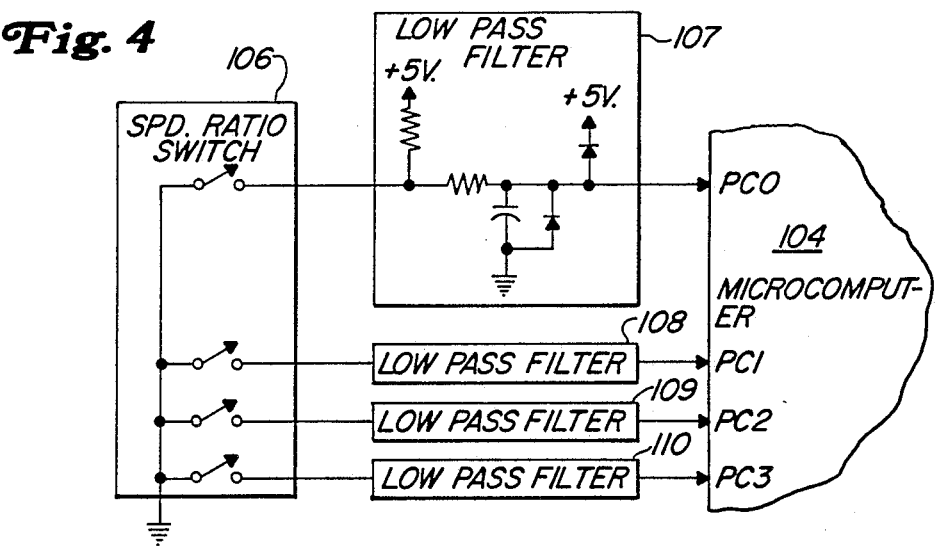
FIG. 4 is an electrical schematic of the operator input assembly.

With the present invention, the D.C. gear motor can also be controlled by reel speed electronic controller 100 which is provided with reel speed ratio inputs from speed ratio selector switch 106. The automatic controller comprises a microcomputer 104, such as Motorola Microcomputer 6805R3, supplied by the Motorola Corporation of Schaumberg, Ill. The microcomputer is provided inputs from the operator who selects at which speed ratio to drive the reel or picker units in relation to combine ground speed. The operator input assembly comprises switch 106 which is electrically coupled through low pass filters 107, 108, 109 and 110, to ports PC0, PC1, PC2 and PC3 on the microcomputer. As seen in FIG. 4, the speed ratio switch comprises a binary coded switch which can provide up to 16 different outputs (4×4) to the microcomputer. This binary coded switch can be supplied by Standard Grigsby, of Aurora, Ill., Part No. 8714. FIG. 4 also illustrates the electrical schematic of low pass filter 107 which is identical for low pass filters 108, 109 and 110.

Figure 5:
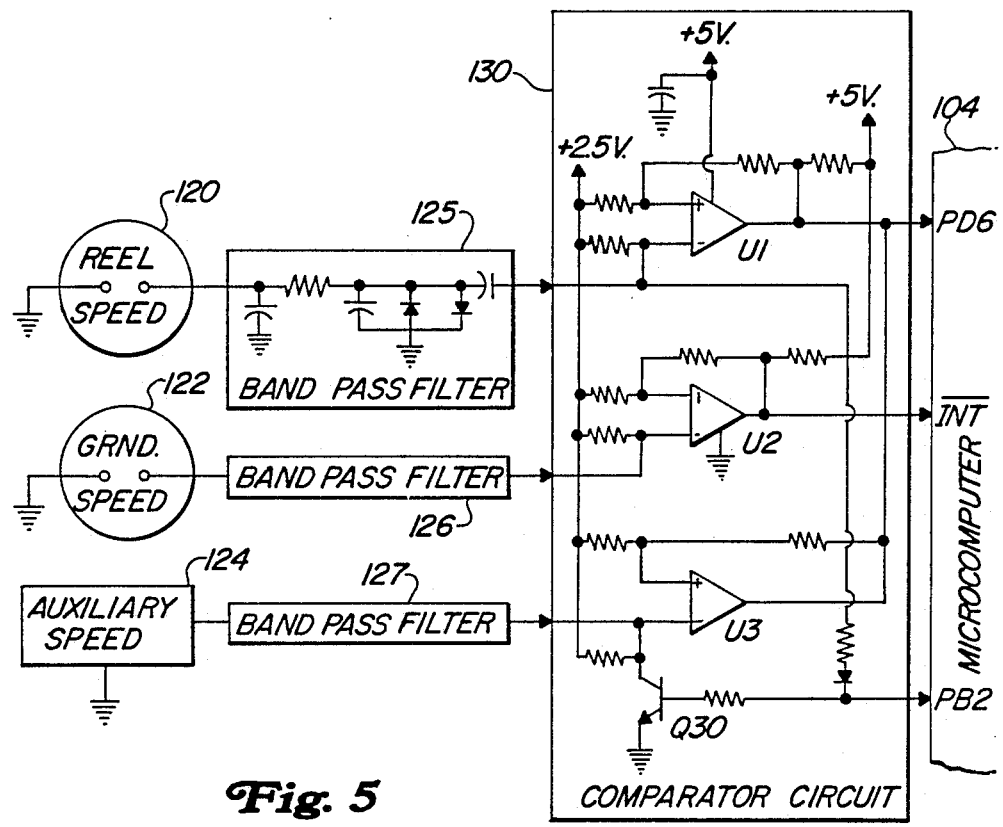
FIG. 5 is an electrical schematic of the sensor input assembly.

The microcomputer is also provided with sensor inputs from various speed sensors mounted on the combine. These sensors comprise a reel speed sensor 120, a ground speed sensor 122, and an auxiliary speed sensor 124. All of these sensors may comprise magnetic sensors of the kind marketed by Wabash Magnetics of Wabash, Ind. The signals from each of these sensors is passed through band pass filters 125, 126 and 127 which are provided with a clipper circuit for protecting the microcomputer. These filters are used to filter out electromagnetic interference. The specific circuitry of band pass filter 125 and its related clipper circuit is illustrated in FIG. 5, and is the same for band pass filters 126 and 127. The output of the band pass filters is directed to a comparator circuit 130 for providing a square wave output to ports PD6 and INT of the microcomputer. PB2 provides a control input to transistor Q30. The electrical schematic of the comparator circuit is also illustrated in FIG. 5.

The comparator circuit comprises three comparators U1, U2 and U3. The inverting input of comparators U1, U2 and U3 is respectively electrically coupled to reel speed sensor 120, ground speed sensor 122 and auxiliary speed input 124. The non-inverting input of each comparator is electrically coupled to the 2.5 V.D.C. voltage source of the power conditioner. The output of comparators U1 and U3 are electrically coupled to port PD6 of the microcomputer, whereas the output of comparator U2 is applied to the INT input of the microcomputer. Transistor Q30 is used to select between the outputs of comparators U1 and U3. More specifically, in response to a row crop header being mounted to the combine, auxiliary speed switch 144 is coupled to ground, microcomputer 104 through port PB2 sends a control signal to transistor Q30 grounding the inverting input of either comparator U1 or U3. In this way, the speed input from the selected harvesting assembly is always applied to port PD6.

The ground speed sensor 122 is operatively coupled to transmission 64 for providing a transmission speed signal that can be used to generate a corresponding ground speed signal. The reel speed sensor 120 is operatively coupled to reel 23 for providing a reel speed signal, and auxiliary speed input sensor 124 is operatively coupled to the feederhouse.

Figure 6:
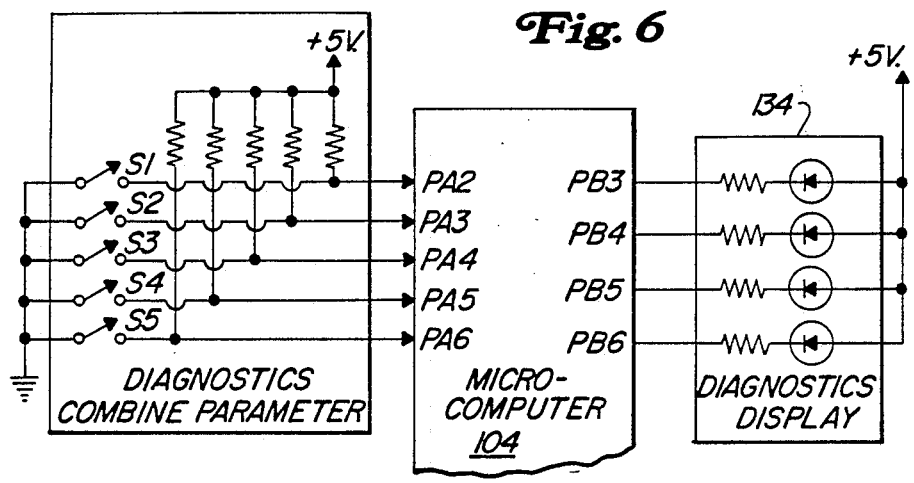
FIG. 6 is an electrical flow chart of the diagnostic trigger switch an parameter set input assembly, and the diagnostics display.

The automatic control system is also provided with a third input source comprising a diagnostic and combine parameter switches 132. More specifically, as illustrated in FIG. 6, switch S1 is used to trigger the diagnostic portion of the software program, switches S2-S4 are used to set the various operating parameters of the combine and switch S5 is held in reserve. More specifically, switches S2-S4 are used to set the tire size of the combine and the final drive ratios to correctly calibrate the microprocessor to the particular combine configuration so that the ground speed is correctly calculated. The inputs from this input assembly are applied to ports PA2, PA3, PA4, PA5 and PA6 of the microcomputer.

The automatic controller is also provided with a diagnostic display 134 comprising four LED's as illustrated in FIG. 6. These LED's can indicate sixteen (4×4) potential problems by the combination in which they are lit or unlit. More specifically, a mechanic or technician checking out the automatic control system would throw switch S1 to trigger the diagnostics routine of the software program, run the combine at a specified speed as the DGNSET sub-routine of the software checks the operating elements. The technician would then check the diagnostic display, generated by the DIADSP sub-routine, to see the light combination. The technician or mechanic would look up this light combination in a service manual to determine what area of the automatic control system needed to be checked further.

Ports PB1, PB0, AN0, AN1, VSS, VRL, PA1 and PA0 of the microcomputer are coupled to permanent magnet motor control circuit 142 for driving permanent magnet DC gear motor 72 to control the positioning of valve 70. DC gear motor 72 is electrically coupled to permanent magnet motor control 142 by jacks J1-3 and J1-4. The motor control circuit is better illustrated in FIG. 7 and essentially comprises four field effect transistors (FET) Q1, Q2, Q3 and Q4, which are triggered from the outputs of ports PB1, PB8, PA1 and PA0 through four transistor pairs Q5 and Q6, Q7 and Q8, Q9 and Q10, and Q11 and Q12. Each of the transistor pairs are associated with one of the field effect transistors.

More specifically, field effect transistors Q1 and Q4 are used to drive the DC motor in a first direction, whereas field effect transistors Q2 and Q3 are used to drive the DC gear motor in the reverse direction. When Q1 is triggered, it provides a path from the 12 volt DC source to the DC gear motor and Q4 is simultaneously triggered and provides a path from the DC gear motor to ground. Similarly, when Q2 is triggered it electrically couples the DC gear motor to the 12 volt source and Q3 provides a path for electrically coupling the DC gear motor to ground. In this way, the microcomputer, controls the direction of the DC gear motor.

The microcomputer senses the electrical potential supplied to the gear motor through analog input ports AN0 and AN1. In this way, if the gear motor is being manually driven by the operator through manual control switch 73, the microcomputer will not drive the motor and will wait until the operator is no longer driving the gear motor and switch 73 has returned to neutral. In addition to detecting if an operator is controlling the motor, ports AN0 and AN1 also detect if the power supply lines to the motor have become shorted. If a short is detected, the microcomputer will not drive the motor until the short is corrected.

The DC gear motor itself comprises a permanent magnet motor. The motor should be provided with a limit switch such as is available from Riverside Electronics of Lewiston, Minn. The limit switch stops the motor at zero and 180° rotation to prevent damage to the valve by the motor.

As described above, the present invention can be used to drive a reel or pickup belt on a harvesting platform, but it should be noted, that it can also be used to drive a row crop header and/or a corn head. This auxiliary system is triggered by assembly switch 144. Switch 144 is actuated by electrically coupling port PB7 of the microcomputer to ground through a suitable electric coupling. Switch 144 can be incorporated into the mechanical mounting assembly of the row crop and/or corn head so that as the row crop head is mounted, port PD7 is coupled to ground.

Figure 7:
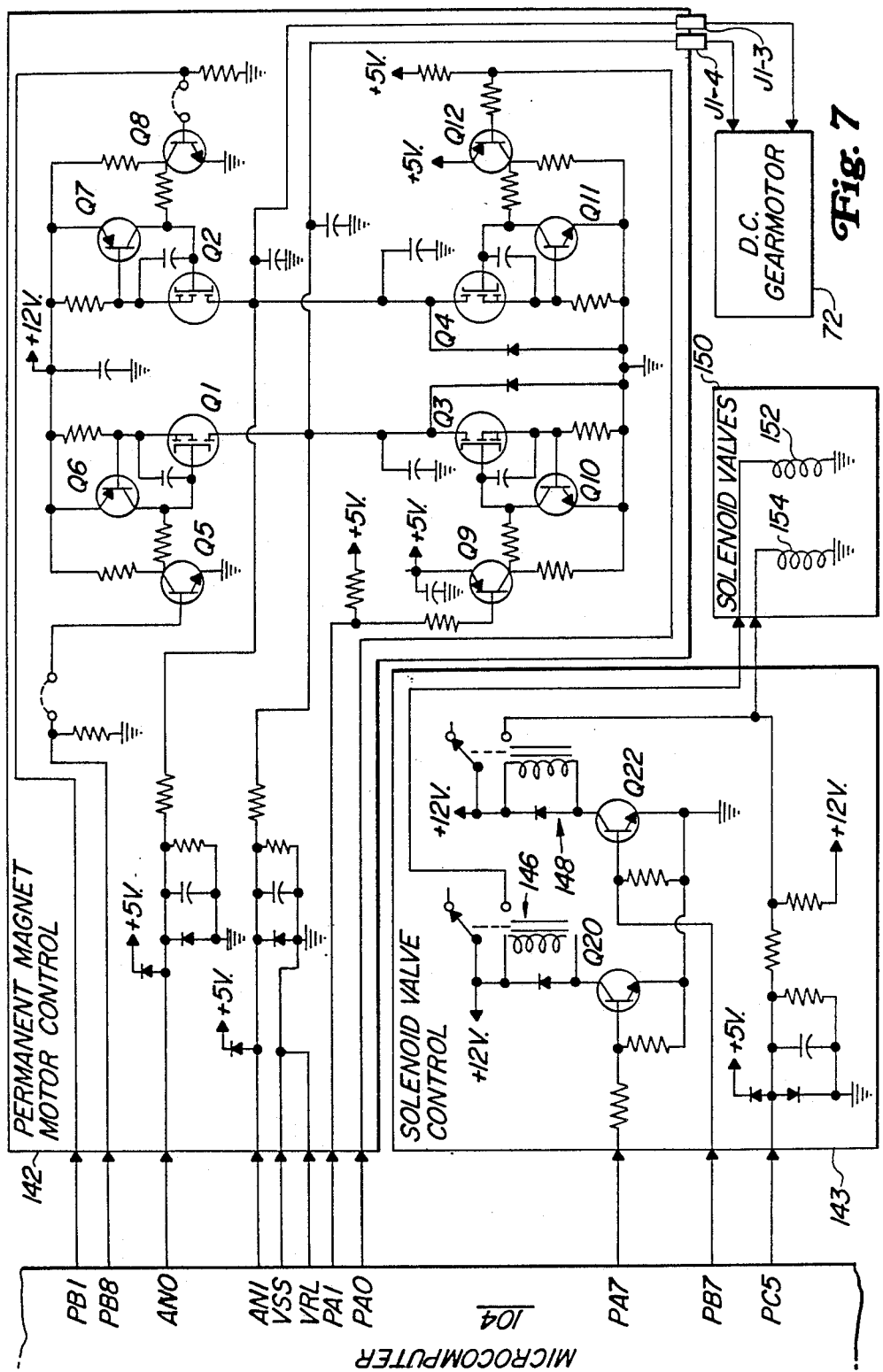
FIG. 7 is an electrical schematic of the drive circuitry for the permanent magnet DC gear motor which controls the hydraulic flow control valve for driving the gathering units of the harvesting platform, and also the drive circuitry for controlling solenoid control valves for driving the gathering units of the row crop headers.
Figure 8:
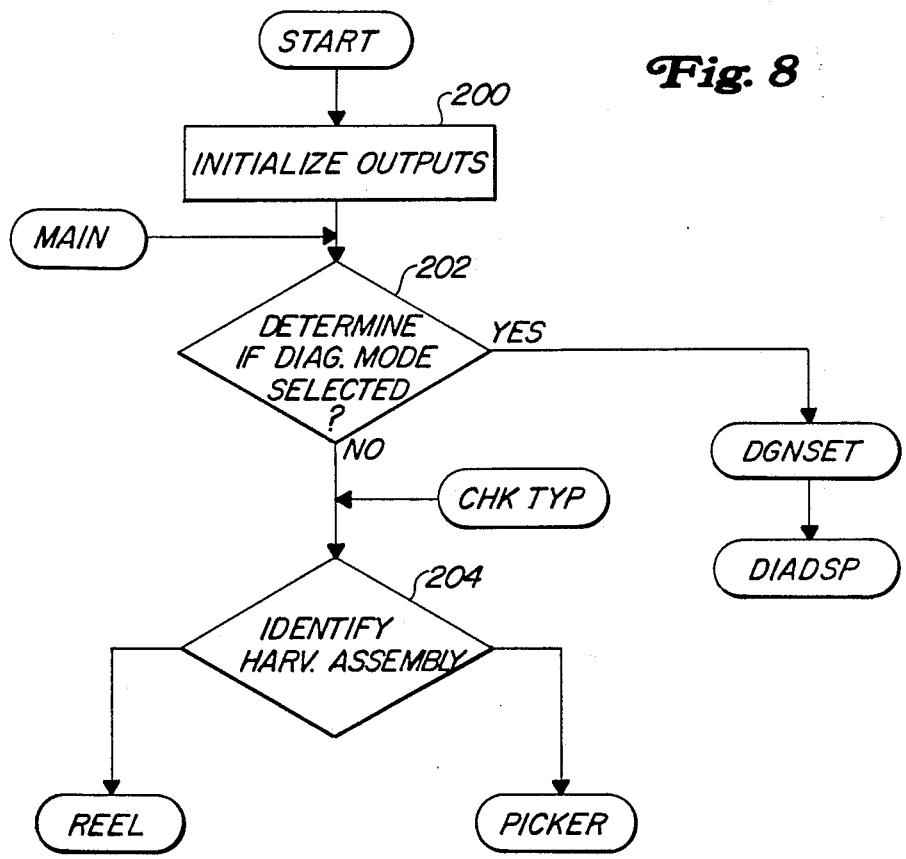
FIG. 8 is an overview flow chart of the software used in the automatic controller.

The auxiliary speed input sensor would be located on the feederhouse and would operate in a manner similar to the reel speed sensor in that it would direct an input signal through the band pass filter 127 to comparator circuit 130 and to the microcomputer. The microcomputer would provide an output signal through ports PA7, PB7 and PC5 to the solenoid valve control circuitry 143, which is illustrated in FIG. 7. The solenoid valve control circuit comprises two relays 146 and 148 for triggering two solenoid valves. The relays are triggered by transistors Q20 and Q22 and are used to control two solenoid valve coils 152 and 154. The microcomputer, through port PC5, controls the energization of solenoid 154. When solenoid 152 is energized, the speed of the front end equipment is decreased. However, energizing both solenoids increases equipment speed. The solenoid valves 150 are used to adjust the effective diameter of variable sheaves which are used to drive the feederhouse and the row and/or corn head.

The microcomputer, through port PC4, is electrically coupled to the header lift switch 140. In response to the header being lifted, switch 140 signals the microcomputer, which in turn stops solenoid valves 150 from opening. This prevents overloading of the hydraulic pump that supplies both hydraulic fluid to the header lift circuit and solenoid valves 150.

It should be noted that the present automatic control system senses both ground speed and the eventual output speed of the harvesting assembly. It then, through the software and in response to the input of the operator ratio select or switch, adjusts the speed of the harvest assembly as a desired ratio of ground speed. As discussed above, the harvester assembly can be a reel, a pickup belt, a row crop header and/or a corn head. The software for accomplishing these tasks which is programmed into the ROM of the microcomputer will be discussed below.

Software

The software stored in the microcomputer is illustrated in simplified flow charts illustrated in FIGS. 8–12.

The automatic control system is actuated by starting the combine and switching switch 106 to the desired ground speed ratio. To begin with, at step 200, the computer initializes the outputs by clearing the microcomputer RAM and starts sensing the various inputs. Next, at step 202, the microcomputer interrogates switch S1 of the diagnostics and combine parameter switch 132. If this switch is actuated, the automatic control system runs the diagnostic routine; if this switch is not actuated, the program proceeds to the REEL or PICKER routine control decision at step 204. At step 204, the microcomputer interrogates assembly switch 144. If this switch is actuated, the microcomputer proceeds with the PICKER routine, if this switch is not actuated, the microcomputer proceeds with the REEL routine.

REEL Routine

In REEL, the microprocessor initially detects, at step 206 the selected speed ratio set by the operator at switch 106. At step 208, the microcomputer detects the ground speed signal received from sensor 122 and calculates the ground speed based on the combine parameters set in switches S2–S4. At step 210, the microcomputer senses reel speed based on the reel speed signal received from sensor 120. From these inputs, at step 212, the microcomputer calculates the desired reel speed as being ground speed multiplied by the speed input ratio. Based on the calculated desired reel speed, the microcomputer from a lookup table stored therein, sets up gain change points A–J, at step 214. The curve illustrated in FIG. 13 is a graphical presentation of the gain change points A–J and represents the path by which the microcomputer will accelerate or deaccelerate the reel to reach the desired speed.

The microcomputer then calculates the error signal, at step 216, by subtracting the desired reel speed from the actual reel speed. Depending on whether the error signal is positive, negative, or equal, as determined at step 218, determines whether FETS Q1 and Q4, or Q2 and Q3 are triggered by the microcomputer. At steps 220 and 222, the microcomputer calculates the electrical signal to be directed to the gear motor. This signal is determined by multiplying the absolute value of the error signal by the gain as determined in FIG. 13. Therefore, the required electrical signal can be calculated from the vertical axis of FIG. 13.

Before the motor command signal can be applied to the motor, the microcomputer, at step 224, checks the electric signal at analog input ports AN0 and AN1 to check if the motor is being manually controlled or has short circuited. If the motor is okay, the output control signal is directed to the motor, at step 228, for driving the valve. If the motor has shorted or is being manually controlled, the outputs from AN0 and AN1 are turned off at step 226. The microcomputer then returns to the beginning of the program at MAIN and continually updates the process.

Figure 13:
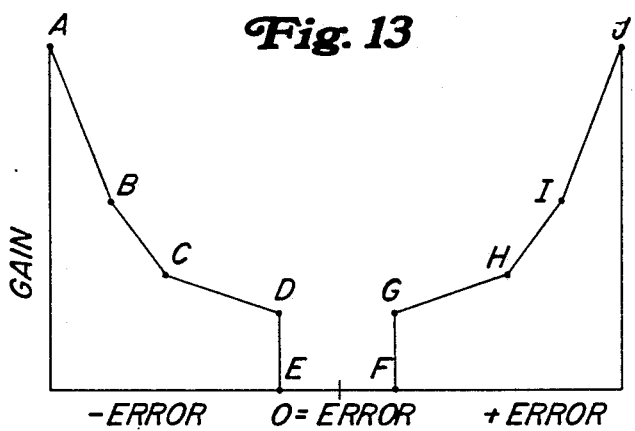
FIG. 13 is a graph of the variable gain method of driving the gear motor.
Figure 9:
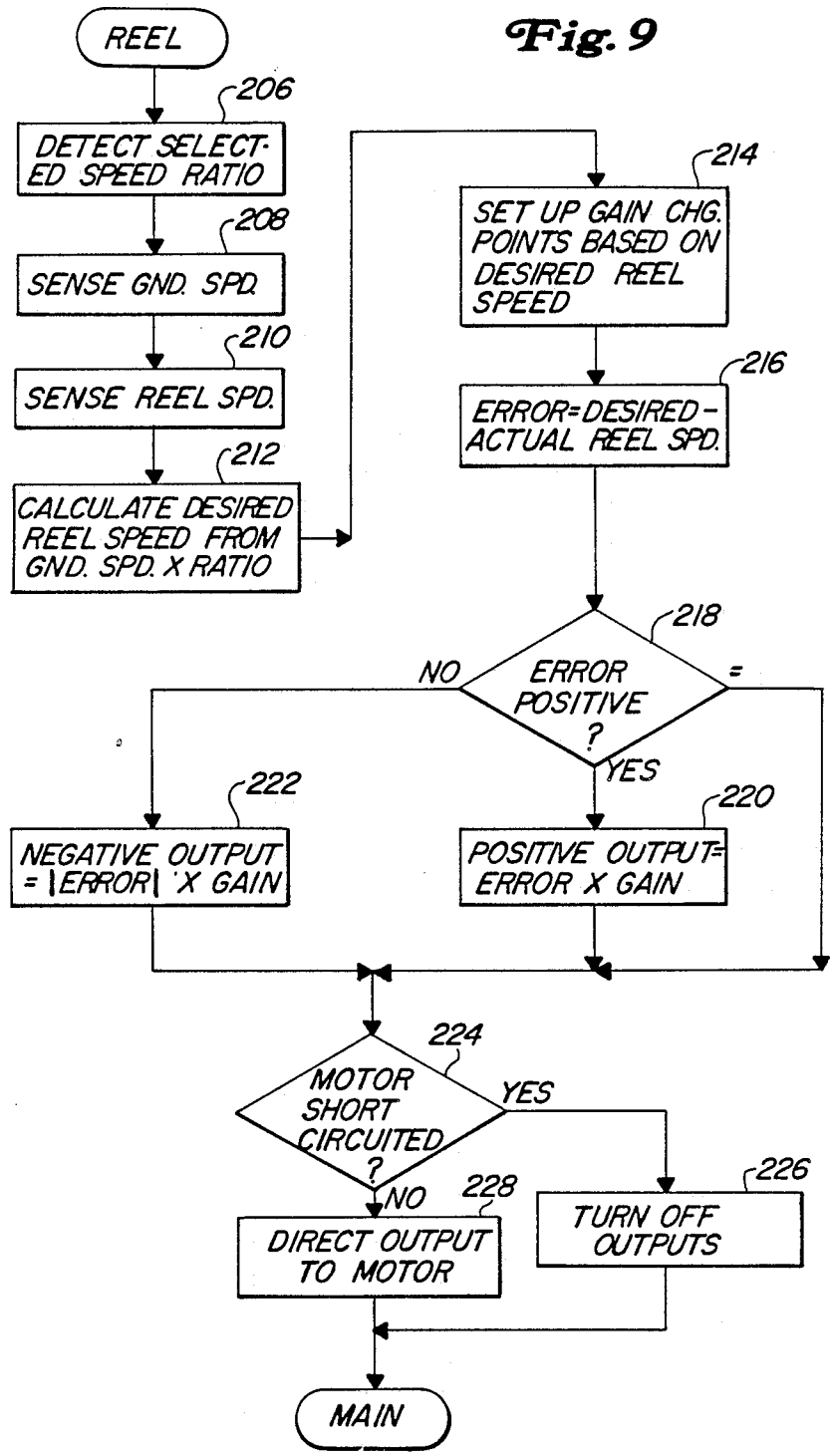
FIG. 9 is a flow chart of the REEL software routine.
Figure 10:
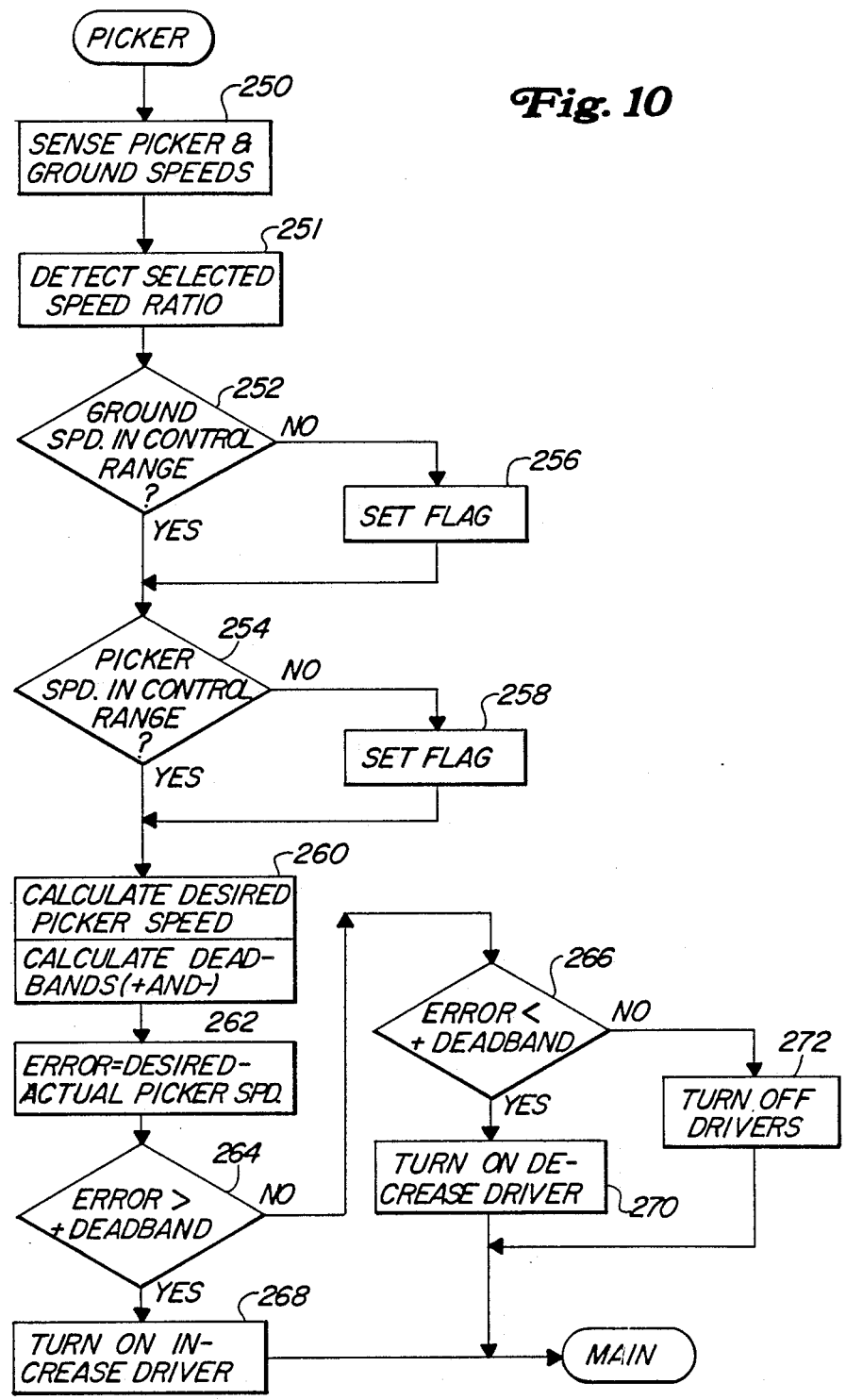
FIG. 10 is a flow chart of the PICKER software routine.

The curve illustrated in FIG. 13 is stored in a lookup table stored in the memory of the microcomputer. However, this curve can also be generated from a polynomial equation to provide a continuously changing response pattern. However, for simplicity purposes, the lookup table generated curve was selected which is linear between adjacent gain set points. The principal feature of the curve is that the overall curve is non-linear and that the greater the error in absolute terms, the greater the signal response. In this way, the control system more rapidly is driven to a zero error condition in which the reel is being driven at the correct speed ratio. A deadband is provided on either side of the zero error condition to provide an acceptable range of error conditions in which the reel speed will not have to be adjusted.

It may be desired that the curves located on either side of the dead band illustrated in FIG. 13 not be of the same slope. This is because it is easier to slow down the reel, because of its inherent drag, than to speed up the reel. Therefore, the gain slope for accelerating the reel may be steeper than the gain slope for deaccelerating the reel.

PICKER Routine

If switch 144 is coupled to ground, the PICKER routine is initiated. The microcomputer is directed to read the picker speed and the ground speed at step 250. At step 251, the microcomputer detects the selected speed ratio at switch 106. Next, it is determined whether the ground speed or picker speed are in the correct control range, at steps 252 and 254, respectively. If they are not, diagnostic flags are set at steps 256 and 258, which will be referred to when discussing the diagnostic routine.

After determining if the ground speed and picker speed are in the control range, it is necessary at step 260 to calculate the desired picker speed from the speed ratio input of switch 106 and the ground speed. The desired picker speed is calculated by multiplying the selected ratio by the actual ground speed. In step 260, after the desired picker speed is calculated, a dead band range is calculated on either side of the zero error condition to provide an acceptable range of error conditions in which the picker speed will not have to be adjusted. After the dead band is calculated, the error is calculated, at step 262, by subtracting the actual picker speed from the desired picker speed.

The calculated error is then compared to the positive dead band limit, at step 264, and the negative dead band limit, at step 266, to determine if the solenoid valves need to be adjusted. If the calculated error falls within the dead band, the solenoid valves are not adjusted. However, at step 268, if the error is greater than the positive dead band, the valves are adjusted to increase the speed of the driver. Similarly, at step 270 if the error is less than the negative dead band, the solenoid valves are adjusted to change the diameter of the variable sheaves and to decrease the speed of the driver. After adjustments are made to the solenoid or it has been decided not to adjust the solenoid valve at step 272, the program returns to the beginning of the program at MAIN to continually update the process.

Diagnostic Routine (DGNSET/DIADSP)

Figure 11:
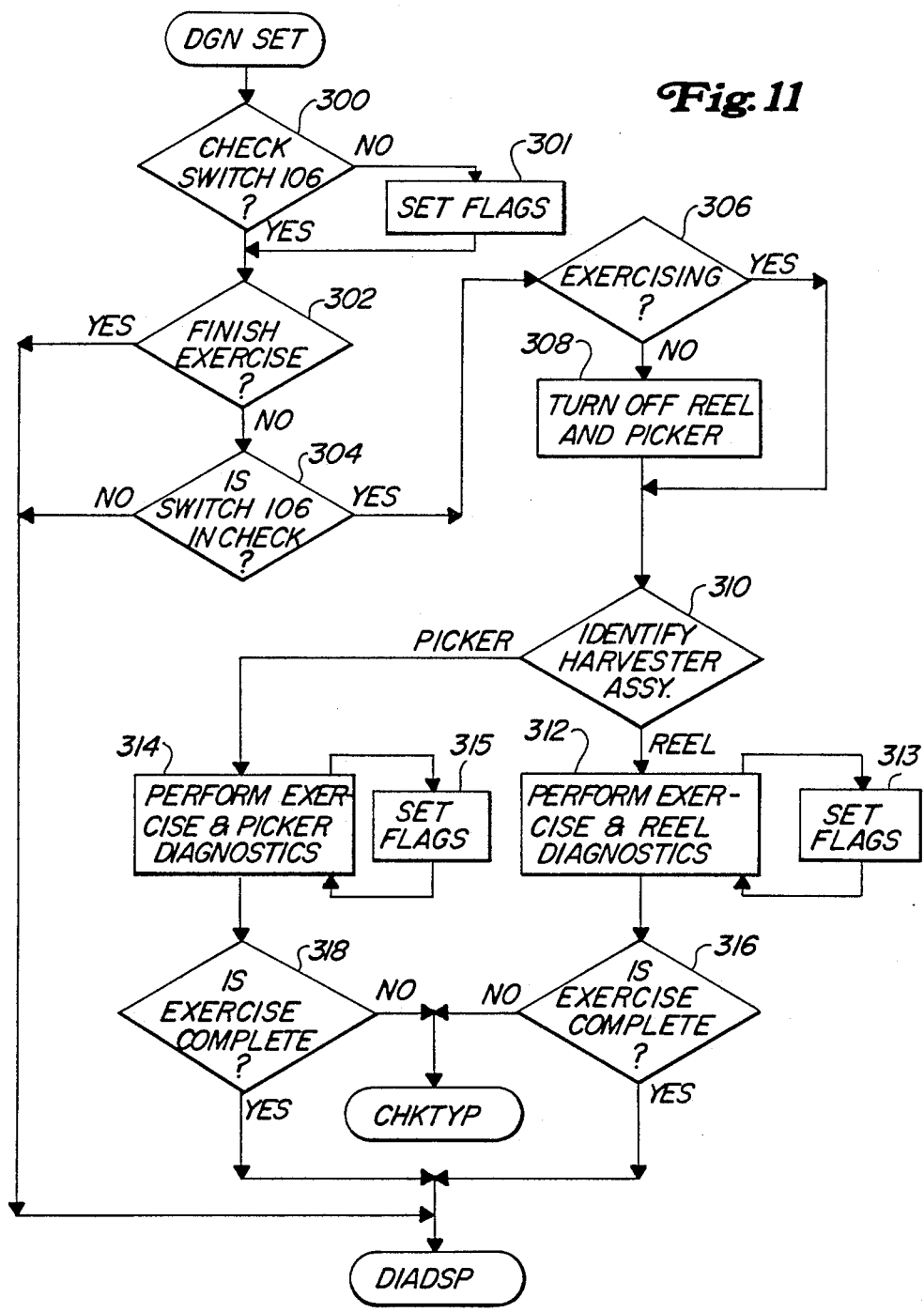
FIG. 11 is a flow chart of the DGNSET sub-routine.
Figure 12A:
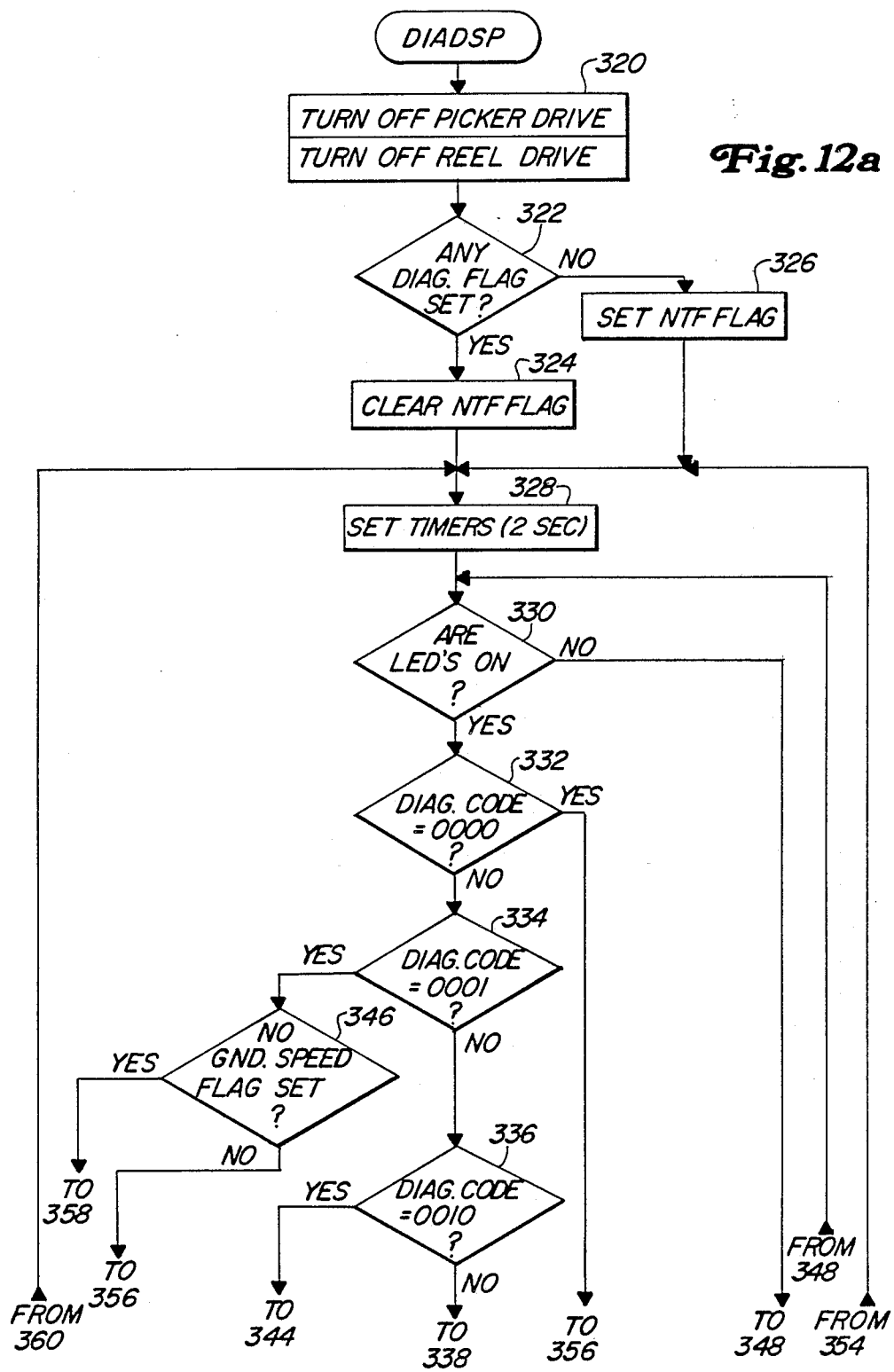
FIGS. 12a and 12b are flow charts of the DIADSP sub-routine.
Figure 12B:
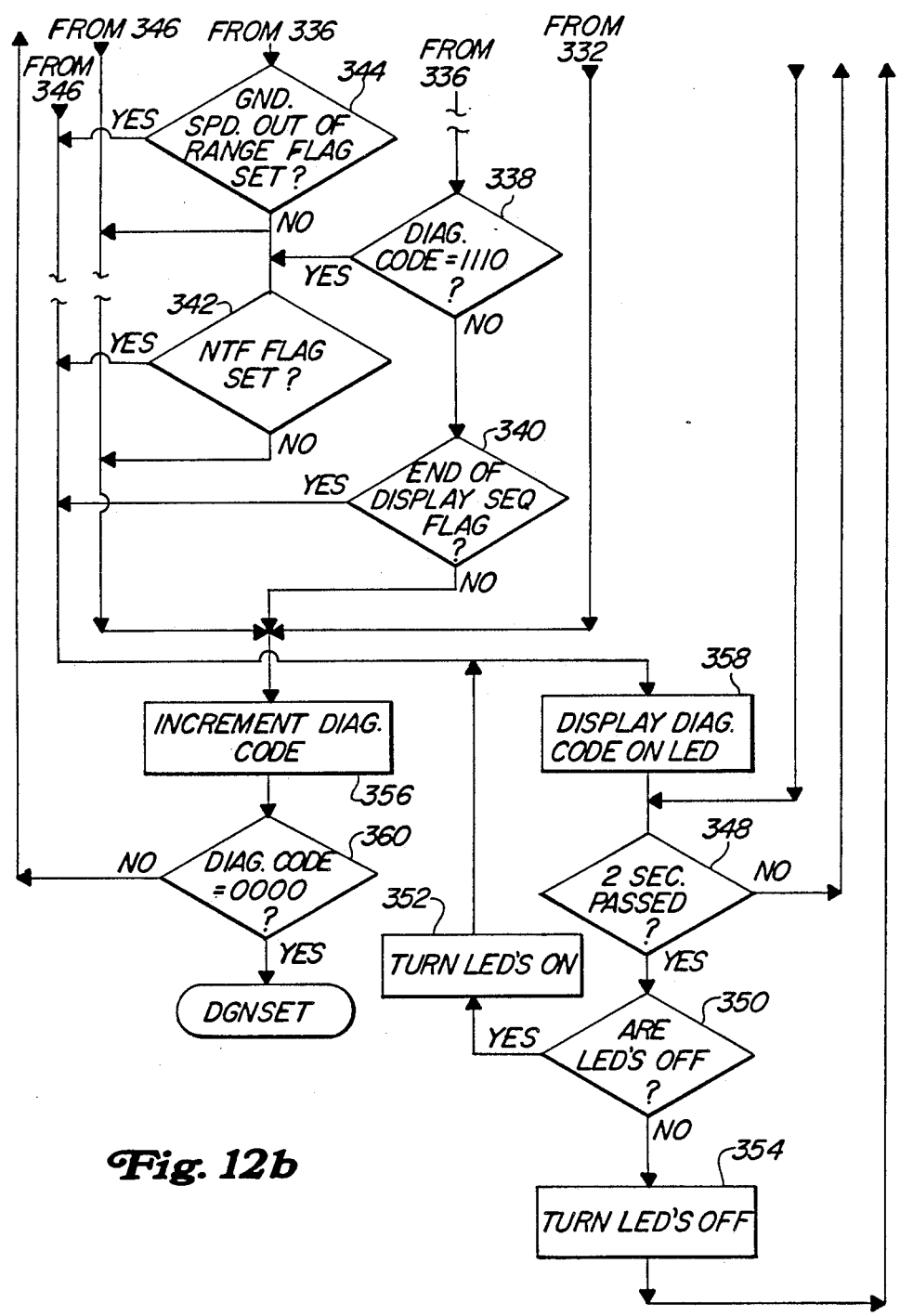

If switch S1 of the switch 132 is closed, a diagnostic program better illustrated in FIGS. 11, 12a and 12b is run to determine if the control system is functioning correctly.

The maintenance technician initially switches switch S1 of the diagnostic and combine parameter switch to an ON position and then starts the combine. The operator checks to see that switch 106 is switched to an OFF position and proceeds to drive the combine at a predetermined speed outlined in the maintenance manual. At this point, the operator then switches switch 106 to a CHECK position. In the initial OFF position, all the switches in switch 106 are open. At step 300 the microcomputer checks to see if each of these switches are open. If one or more of the switches are closed during this OFF sequence diagnostic flags are set at step 301.

At step 302, the microcomputer checks to see if DGNSET if finished exercising the gathering units. If DGNSET is finished, the microcomputer proceeds to the DIADSP sub-routine, if DGNSET is not finished, the microcomputer proceeds to step 304. At step 304, the microcomputer checks to determine if switch 106 is in the CHECK position. If switch 106 is in the CHECK position, the microcomputer proceeds to step 306, if switch 106 is not in the check position, the microcomputer proceeds to the DIADSP sub-routine. It should be noted that if no diagnostic flags are erected at step 301, the DIADSP sub-routine would cycle the microcomputer back to the beginning of DGNSET. If, however, flags were set up at step 301, these flags would be displayed by the DIADSP sub-routine.

Returning to step 306, this step checks to see if the gathering units are being exercised by the DGNSET sub-routine. If they are being exercised, the microcomputer proceeds to step 310, if they are not being exercised, the microcomputer is directed to step 308 which turns off the gathering units.

As above, assembly switch 144 identifies which harvesting assembly is mounted to the combine. At step 310, the microcomputer interrogates switch 144 to determine if the exercise routine for the reel should be performed, at step 312, or the exercise routine for the picker should be performed, at step 314. Steps 312 and 314 are provided with steps for flagging problem areas during the exercise routine, comprising steps 313 and 315, respectively. It should also be noted that the PICKER routine also includes diagnostic flagging at steps 256 and 258. The REEL routine does not include these diagnostic flagging steps and relies on step 312 to identify diagnostic flags.

The automatic diagnostic exercising cycle comprises increasing the speed of the reel or picker for a fixed period of time, then holding that speed for a fixed period of time and then decreasing the speed for a similar specified period of time.

At steps 316 and 318, the microcomputer checks to see if the exercising of the gathering units has been completed. If it has not, the exercise routine is cycled through either the REEL or PICKER routines by CHKTYP. Essentially, steps 312 and 314 call up specified gathering unit speed-to-ground speed ratios, that are stored in memory. These speed ratios are processed by the REEL and PICKER routines in exercising the gathering units. In this way, the normal control routines, REEL and PICKER, are used to control the exercising of the gathering units.

After the diagnostic test sub-routine DGNSET has been completed, the diagnostic display sub-routine DIADSP is started. The picker or reel drive are turned off at step 320 and the program now prioritizes and displays the diagnostic flags identified in DGNSET. In prioritizing and displaying the diagnostic flags, the microcomputer first determines if any diagnostic flags have been set at step 322. If flags have been set, step 324 clears the NTF (no trouble found) flag; if no diagnostic flags have been set, step 326 sets the NTF flag. After setting or clearing the NTF flag, the microcomputer proceeds to the next step, which is setting timers. The microcomputer, at step 328, sets the timers for two seconds.

At step 330, the microcomputer checks if the display LED's 134 are on. If the display LED's are on, the program checks the various diagnostic flags at steps 332, 334, 336, 338, 340, 342, 344 and 346. If the LED's are off, the program determines if two seconds has elapsed at step 348. At steps 350 and 352, if the display LED's are turned off for two seconds, they are turned back on. At steps 350 and 354, if the display LED's are turned on for two seconds, they are turned off. After the LED's are turned back on, the program can evaluate the diagnostic flags set in the DGNSET sub-routine, in evaluation steps 332–346. In displaying diagnostic information, the LED's flash the various diagnostic codes on and off for two seconds. The two second off period between adjacent display codes helps set off the adjacent codes for easier operator review.

The program is set up to evaluate the various diagnostic flags in a set order or priority. The specific diagnostic flag being checked is determined by the current diagnostic code number. The diagnostic code is a four digit binary number that begins at 0000 (0) and ends at diagnostic code 1110 (14). The diagnostic code is increased at step 356 by one each time the flags are evaluated. More specifically, each time a flag is checked and is not set; or each time the flag is checked, set and the diagnostic code displayed; the diagnostic code is increased by one to check the next flag in the diagnostic code sequence.

Steps 334 and 346, 336 and 344, and 338 and 342 are paired to form diagnostic display decisions. The first step in each pair is the determination of the current diagnostic code number. As this number increases by one, through each iteration, this number continually changes and in effect prioritizes the sequencing of the display decisions. The second step in each pair is tied to a particular diagnostic flag.

For example, step 346 determines if there was no ground speed recorded during the diagnostic testing. If this determination is yes, the diagnostic code of 0001 is displayed on the LED's by step 358. If ground speed was recorded, the microcomputer would proceed to step 356 where the diagnostic code would be increased by one to 0010 (2). Step 360 then checks the diagnostic code to determine if its 0000 (0) and if it is not, recycles the microcomputer to reset the timers. Steps 332 and 334 are then interrogated again regarding the diagnostic code until reaching step 336. As the diagnostic code is 0010, step 336 directs the microcomputer to step 344 which determines whether the ground speed was out of acceptable range. Step 344 then either recycles the microcomputer through steps 356 and 360 or displays the diagnostic code at step 358.

The microcomputer proceeds through eleven more diagnostic display decisions, corresponding to diagnostic codes 0011 (3) to 1101 (13) which are not shown. These codes and the illustrated diagnostic display decision are listed in Table 1. Diagnostic code 1110 (14) is checked at step 338. If this diagnostic code is detected, the microcomputer is directed to step 342. If this code is not detected, the microcomputer is directed to step 340. Step 342 determines if the NTF (no trouble found) flag was set in step 326. If the NTF flag was set, the microcomputer is directed to step 358 which directs diagnostic display 134 to display diagnostic code 1110. If the NTF flag was not set, the microcomputer is directed to step 356 which increases the diagnostic code by one. From there, step 360 recycles the microcomputer to the beginning to reset the timers. As the diagnostic code is now 1111 (0), step 340 directs the microcomputer to step 358 which displays the end of display flag.

It should be noted that FIG. 11 only illustrates a truncated version of the program. More specifically, the diagnostic code steps and the related flag evaluation decisions are listed in Table 1. These diagnostic steps are prioritized into a defined order. The maintenance technician fixes the problem area associated with each diagnostic flag in the defined order. As the technician solves the first flagged problem area and reruns DGNSET to check his or her fix, some of the later flagged problem areas may disappear as they were associated with the fix.

TABLE 1

| Diagnostic Code | Flag Evaluated |
| --- | --- |
| 0000 (0) | Start/end diagnostic code (Steps 332 & 360) |
| 0001 (1) | No ground speed (Steps 334 & 346) |
| 0010 (2) | Ground speed out of range (Steps 336 & 344) |
| 0011 (3) | No gathering unit |
| 0100 (4) | Gathering unit speed out of range |
| 0101 (5) | Ratio switch 106 bit 1 |
| 0110 (6) | Ratio switch 106 bit 2 |
| 0111 (7) | Ratio switch 106 bit 4 |
| 1000 (8) | Ratio switch 106 bit 8 |
| 1001 (9) | J1-3 shorted |
| 1010 (10) | J1-4 shorted |
| 1011 (11) | Gathering unit speed will not increase |
| 1100 (12) | Gathering unit speed will not decrease |
| 1101 (13) | Unused flag set |
| 1110 (14) | No trouble flag (Steps 338 and 342) |
| 1111 (15) | End of display sequence (Step 340) |

The evaluation part of this program starts with the diagnostic code being 0000 at step 332. It also ends with the diagnostic code being 0000 at step 360. If the diagnostic code is 0000 at step 360, the microcomputer is returned to the start of the DGNSET sub-routine.

The above-described invention provided an automatic control system for controlling the speed of gathering units for harvesting assemblies. The system is easy to use and can be used with a variety of harvesting assemblies.

We claim:
1. A method of controlling the speed of a gathering unit of a harvesting assembly relative to the ground speed of a harvesting machine on which the harvesting assembly is mounted, providing an electrical controller coupled to a ground speed sensor, a gathering unit speed sensor, a ratio selector and a driving means, comprising the steps of:
   identifying the harvesting assembly which is mounted to the harvesting machine;
   sensing the ground speed of the harvesting machine and producing a ground speed signal;
   sensing the speed of the gathering unit of the harvesting assembly and producing a gathering unit speed signal;
   detecting the selected gathering unit speed-to-ground speed ratio as selected by the operator on a ratio selector;
   calculating the desired gathering unit speed from the selected ratio and the ground speed signal;
   determining if the gathering unit is being driven at the desired gathering unit speed according to the selected ratio and the gathering unit speed signal; and
   driving the gathering unit at the desired gathering unit speed to maintain the selected gathering unit speed-to-ground speed ratio.

2. A method as defined by claim 1 comprising the additional step of setting up gain change point for driving the gathering to the desired gathering unit speed.

3. A method as defined by claim 2 wherein the gain change points form a non-linear curve for more quickly driving the gathering unit to the desired gathering unit speed.

4. A method as defined by claim 3 comprising the additional step of checking to see if the speed of the gathering unit is being manually controlled.

5. A method as defined by claim 1 comprising the additional step of determining whether a control switch has been placed in the diagnostic mode.

6. A method as defined by claim 5 wherein if the control switch is placed in the diagnostic mode, the next step is exercising the gathering unit through a diagnostic exercise program.

7. A method as defined by claim during the diagnostic exercise program, the next step is flagging any problems occurring during the exercise program.

8. A method as defined by claim 7 wherein after the problems have been flagged, the next step is prioritizing and displaying the flags in a defined order.

9. A method as defined by claim 7 comprising the additional step of assigning each flag a diagnostic code.

10. A method as defined by claim 9 comprising the additional step using the diagnostic code to prioritize the flagged problems in a defined order.

11. A method as defined by claim 10 comprising the additional step of displaying the diagnostic codes in the defined order.

12. A harvesting machine having a harvesting assembly including a gathering unit for gathering the crop, the gathering unit including a driving means for driving the gathering unit, the harvesting machine having drive wheels for transporting the harvesting machine, the harvesting machine further having:
   a gathering speed control system comprising:
   a ground speed sensor for sensing the ground speed of the harvesting machine and providing a ground speed signal;
   a gathering unit speed sensor for sensing the speed of the gathering unit and providing a gathering unit speed signal;
   an operator setable ratio selector having a plurality of gathering unit speed-to-ground speed ratios;

an assembly switch for identifying different harvesting assemblies having different gathering units that are mounted to the harvesting machine;

an electronic controller coupled to the ground speed sensor, to the gathering unit speed sensor, to the ratio selector, and to the driving means, the electronic controller having a means for determining if the gathering unit is being driven at the desired gathering unit speed according to the setting of the ratio selector, a means for causing the driving means to drive the gathering unit at one of a plurality of the gathering unit speed-to-ground speed ratios depending upon the setting of the ratio selector; and wherein the electronic controller has different configurations for controlling the speed of different gathering units on different harvesting assemblies.

13. A harvesting machine as defined by claim 12 wherein the assembly switch is used to identify if the harvesting assembly mounted to the harvesting machine is a harvesting platform or a row crop header.

* * * * *

UNITED STATES PATENT AND TRADEMARK OFFICE
CERTIFICATE OF CORRECTION

PATENT NO.  : 4,967,544
DATED       : 6 November 1990
INVENTOR(S) : Duane H. Ziegler et al.

It is certified that error appears in the above-identified patent and that said Letters Patent is hereby corrected as shown below:

Column 14, line 23, after "gathering" insert -- unit -- ;
    line 38, after "claim", insert -- 6 wherein -- .

Signed and Sealed this

Twenty-first Day of April, 1992

Attest:

HARRY F. MANBECK, JR.

*Attesting Officer*     *Commissioner of Patents and Trademarks*